United States Patent [19]
Prasad

[11] 3,855,204
[45] Dec. 17, 1974

[54] PROCESS FOR PREPARING ADENOSINE-5'-CARBOXYLIC ACID, ETHYL ESTER

[75] Inventor: Raj Nandan Prasad, Pierrefonds, Quebec, Canada

[73] Assignee: Abbott Laboratories, Chicago, Ill.

[22] Filed: Oct. 27, 1972

[21] Appl. No.: 301,693

[52] U.S. Cl............................................ 260/211.5 R
[51] Int. Cl............................................. C07d 51/54
[58] Field of Search .................. 260/234 R, 211.5 R

[56] References Cited
UNITED STATES PATENTS

| | | | |
|---|---|---|---|
| 2,628,249 | 2/1953 | Bruno | 260/234 R |
| 3,023,183 | 2/1962 | Nelson | 260/234 R |
| 3,697,504 | 10/1972 | Schmidt | 260/211.5 R |

*Primary Examiner*—Johnnie R. Brown
*Attorney, Agent, or Firm*—Robert L. Niblack; Joyce R. Krei; Vincent A. Mallare

[57] ABSTRACT

An improved process for synthesizing adenosine-5'-carboxylic acid, ethyl ester comprising reacting 2'3'-isopropylidene adenosine-5'-carboxylic acid with ethanol in N-ethoxy-carbonyl-2-ethoxy-1,2-dihydroquinoline.

1 Claim, No Drawings

PROCESS FOR PREPARING ADENOSINE-5'-CARBOXYLIC ACID, ETHYL ESTER

DETAILED DESCRIPTION OF THE INVENTION

This invention relates to an improved process for synthesizing adenosine-5'-carboxylic acid, ethyl ester.

Adenosine-5'-carboxylic acid, ethyl ester has been reported to be useful as a cardiovascular agent.

The present invention provides a process for preparing the compound which overcomes the problems of hydrolysis and transesterification encountered in conventional synthetic routes.

The process of this invention comprises reacting 2',3'-isopropylidene adenosine-5'-carboxylic acid with N-ethoxy-carbanoyl-2-ethoxy-1,2-dihydroquinoline (EEDQ) in ethanol at a temperature of from 20° to 30° C. for a period of from 6 to 32 hours. The resulting ethyl ester of the protected isopropylidene acid is then converted to adenosine-5'-carboxylic acid, ethyl ester by heating the isopropylidene compound in a weak acid such as formic or acetic acid.

The following example further illustrates the present invention.

EXAMPLE 1

Preparation of Adenosine-5'-Carboxylic Acid, Ethyl Ester

A suspension of 2',3'-isopropylidene adenosine-5'-carboxylic acid (3.21 g. per; 0.01 mole (prepared according to the method of R. E. Harmon et al., CHEM. IND., London No. 33, 1141 (1969), in 200 ml. of absolute ethanol was stirred with 2.96 g. of EEDQ at room temperature for 18 hours. At the end of this period, the mixture was kept at 60° for 5 hours. The clear solution was concentrated to approximately 40 ml. under reduced pressure. Dilution with ether yielded 2.2 grams of 2',3'-isopropylidene adenosine5'-carboxylic acid, ethyl ester, m.p. 167°–170° C.

The above prepared compound was suspended in 50 percent formic acid (20 ml. per gram of the ester) and was heated for 7 minutes over a steam bath. The clear solution was evaporated under reduced pressure at 40° C. The residue was diluted with water and evaporated. The residual solid was diluted with a 1:1 solution of ethanol-benzene and evaporated. The process was repeated twice until there was no odor of formic acid to be detected. The resulting white solid was triturated with absolute ethanol and ether to yield adenosine5'-carboxylic acid, ethyl ester, m.p. 209°–211° C.

I claim:

1. A method of synthesizing adenosine-5'-carboxylic acid, ethyl ester, consisting essentially of the steps of reacting 2',3'-isopropylidene adenosine-5'-carboxylic acid with ethanol in N-ethoxycarbonyl-2-ethoxy-1,2-dihydroquinoline at a temperature of from 20° to 30° C. for from 6 to 32 hours, and cleaving the isopropylidene protecting group by suspending the resulting compound in a weak acid selected from the group consisting of formic acid and acetic acid at a temperature of about 40° C.

* * * * *